D. W. SHEPHERD.
ORE SEPARATOR.
APPLICATION FILED JUNE 1, 1915.
1,218,809.
Patented Mar. 13, 1917.
2 SHEETS—SHEET 1.
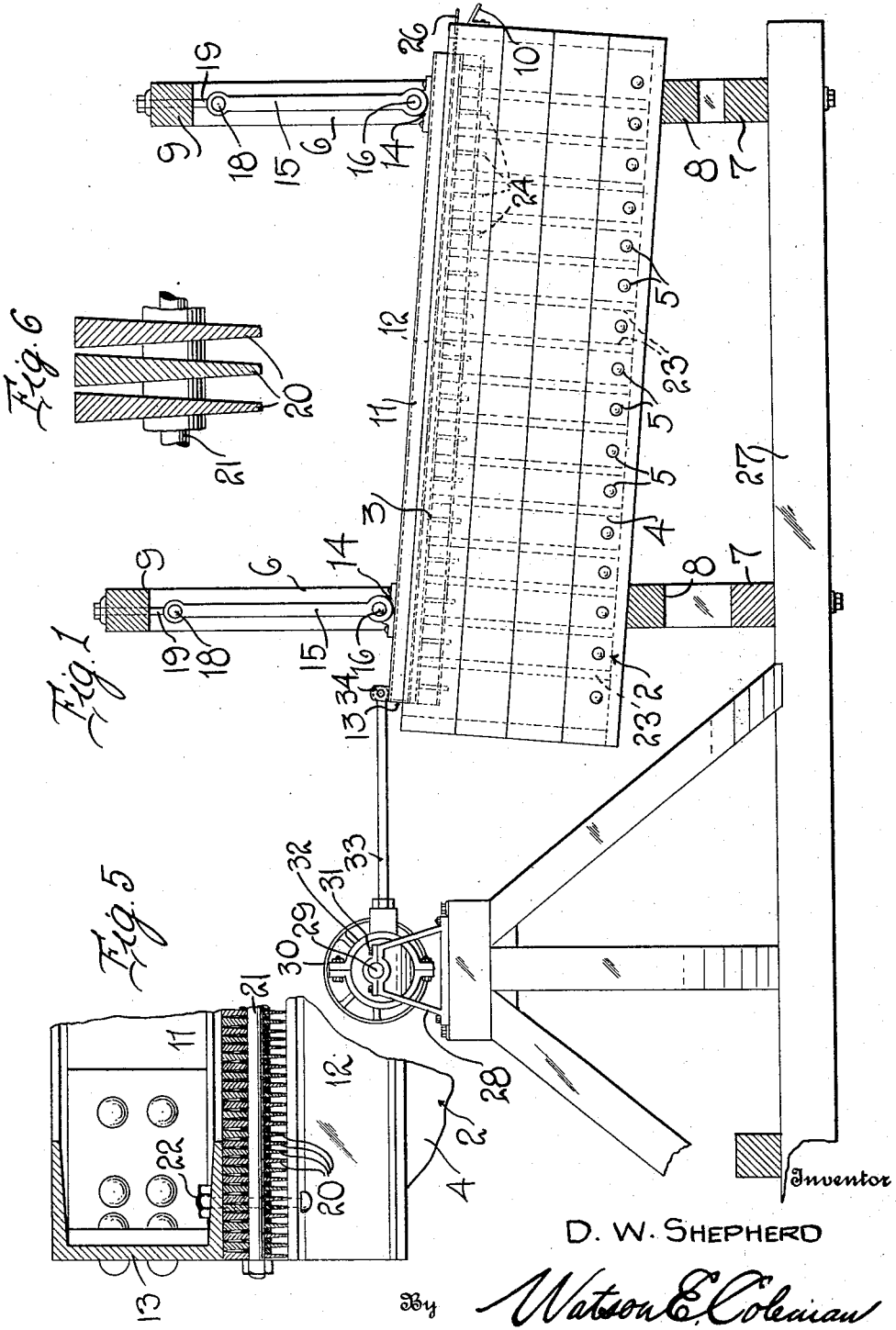
Inventor
D. W. SHEPHERD
By Watson E. Coleman
Attorney D. W. SHEPHERD.
ORE SEPARATOR.
APPLICATION FILED JUNE 1, 1915.
1,218,809.
Patented Mar. 13, 1917.
2 SHEETS—SHEET 2.
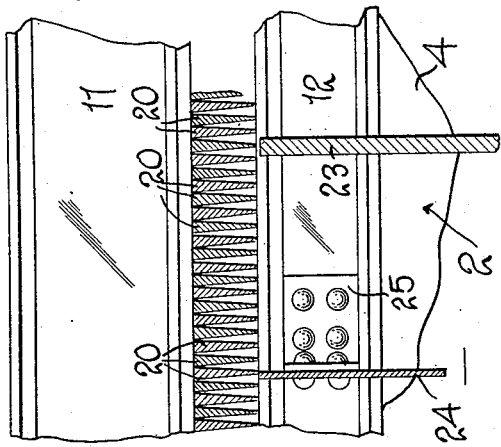
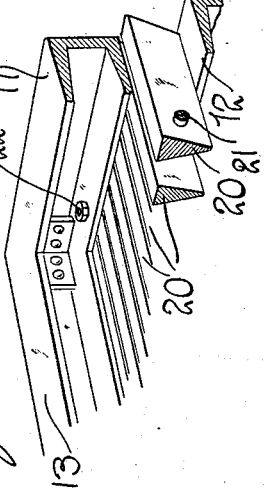
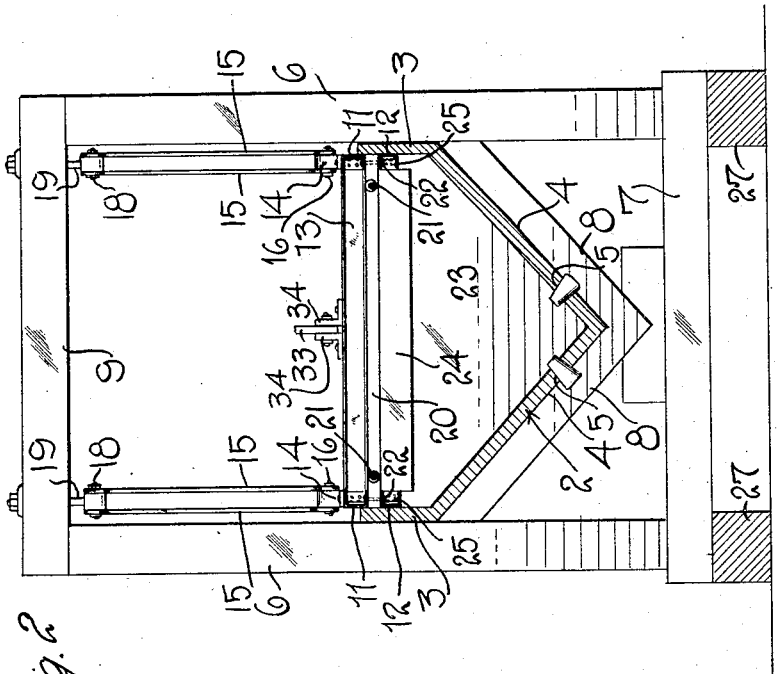
Inventor
D. W. SHEPHERD
By Watson E. Coleman
Attorney

UNITED STATES PATENT OFFICE.

DANIEL W. SHEPHERD, OF RUPERT, IDAHO.

ORE-SEPARATOR.

1,218,809.     Specification of Letters Patent.     Patented Mar. 13, 1917.

Application filed June 1, 1915. Serial No. 31,570.

*To all whom it may concern:*

Be it known that I, DANIEL W. SHEPHERD, a citizen of the United States, residing at Rupert, in the county of Minidoka and State of Idaho, have invented certain new and useful Improvements in Ore-Separators, of which the following is a specification, reference being had to the accompanying drawings.

My invention relates to ore separators, and particularly to that class of separator used for placer mining and including a reciprocating screen and a trough or tank within which the screen operates, the screen being designed to permit the passage of fine sand and gold but to retain and eventually discharge the coarse sand and gravel.

The primary object of my invention is the provision of a very simple separator of this character having a peculiarly constructed screen particularly adapted for permitting the passage of gold and fine sand but preventing the passage of coarse sand and gravel, the formation of the screen being such that there is no liability of the spaces between the elements of the screen becoming clogged.

A further object of my invention is the provision, in connection with a screen of the character above described, of means for forcing water upward through the screen to thereby dislodge and agitate the sand and gravel moving over the top of the screen.

A further object of the invention is the provision, in connection with a water containing trough or tank having outlet openings at its bottom through which the gold and fine sand may be withdrawn from the pockets formed in said trough, of a screen swingingly mounted in the trough and adapted to receive upon it sand and gravel from a placer mine, the swinging screen and the trough being provided with coacting means whereby water may be splashed up through the screen to agitate the sand and gravel traveling over the top of the screen.

Other objects will appear in the course of the following description.

My invention is illustrated in the accompanying drawings, wherein:

Figure 1 is a side elevation, the supporting beams being in section;

Fig. 2 is an end elevation, the tank being in section;

Fig. 3 is a fragmentary longitudinal section of the screen;

Fig. 4 is a fragmentary perspective view of the screen;

Fig. 5 is a fragmentary longitudinal section of the screen at the entrance end thereof;

Fig. 6 is a fragmentary detail section of the screen bars.

Referring to these drawings, 2 designates a tank which, in the working embodiment of my invention, is somewhat over eight feet in length, but which, of course, may be of any desired size. This tank is constructed in any desired manner, but preferably the bottom of the tank is formed with side walls which extend down vertically, as at 3, for a certain distance, and are then downwardly and medially inclined, as at 4, so that the bottom contracts downward. These side walls adjacent the bottom of the tank are formed with normally closed perforations 5 through which the contents of the tank may be withdrawn.

The tank is set upon an inclination and supported in this position by means of a frame comprising the uprights or pairs of standards 6, the cross beams 7, and the downwardly and centrally tank supporting beams 8. The uprights or standards 6 are connected by cross beams 9. The tank is set upon an inclination so that the receiving end of the tank is higher than the discharge end thereof so as to permit a flow of water through the tank. The lower end of the tank is formed with an outwardly and downwardly extending chute 10, as shown clearly in Fig. 1.

Mounted within the tank is a screen composed of an exterior rectangular frame preferably consisting of upper and lower angle irons 11 and 12 supporting between them the screening elements, as will be later stated, and held to each other in any suitable manner. The upper angle irons 11 are connected at the inlet end of the screen by a cross angle iron 13. To the upper flanges of the upper angle irons 11 of the frame are connected the bearing members 14. Links 15 extend down on each side of each of the bearing members, and a pivot pin 16 passes through these links. The upper ends of the links are connected by means of a pivot pin 18 to an eye bolt 19. There are two pairs of these supporting links 15 supporting the lower end of the screen and two pairs supporting the upper end, these bolts 19 passing through the cross beams 9. It will thus be seen that the screen is swingingly supported from these cross beams 9 and may have a limited reciprocating movement within the upper portion of the tank 2.

The screening element, which forms a particular feature of my invention and which I regard as of particular importance, is made up a plurality of transversely extending bars, each bar being designated 20. The shape of each bar is illustrated in Fig. 6. Each bar or blade is thinner at its lower edge than at its upper edge, and in actual practice these wedge-shaped bars or blades are preferably one-eighth inch thick at the top edge, one-sixteenth inch thick at the bottom edge, one inch wide or high, and about four feet long. These bars are placed side by side with spacers disposed between the bars so as to separate the upper edges of the bars from each other by a space about one-sixty-fourth of an inch in thickness. Preferably the total length of the screen is about eight feet. These bars or blades 20 are disposed between the lower and upper flanges respectively of the upper and lower angle irons 11 and 12 constituting the frame and are held in place by longitudinally extending bolts 21 which pass through the ends of the bars from end to end thereof and clamp the bars and spacers in juxtaposition. The upper and lower frames formed of the angle irons 11 and 12 are engaged with each other by means of vertically extending bolts 22, and by tightening up upon these bolts the angle iron frames may be drawn closely together so as to clamp the screening element closely between them.

Extending upward from the bottom of the tank 2 nearly to the top of the tank and extending transversely across the tank, are a plurality of partitions 23, these partitions extending upward in close proximity to the bottom of the screen formed of the bars 20, and preferably these partitions are spaced from each other about six inches. Depending from the lower surface of the screen and extending transversely across it between the angle irons 12 of the frame are the splash plates 24. One of these splash plates is disposed between each pair of partitions and also between the partitions and the end walls of the tank. These splash plates may be effectively mounted upon the angle iron frame 12 by means of angular brackets 25 as shown clearly in Fig. 3. Attached to the swinging screen frame in any suitable manner and projecting outward from the exit end of the screen frame is an apron 26 arranged transversely of the screen frame and which extends over the chute 10 so that the water, gravel, and coarse sand traveling over the upper face of the screen will be discharged over the chute 10 and not be discharged into the tank. The apron 26 is of such a length as to extend over the upper end portion of the chute 10 irrespective of the longitudinal adjustment imparted to the screen during its reciprocatory movement.

While I do not wish to be limited to any particular means for reciprocating the swinging screen, I preferably provide the mechanism illustrated in Fig. 1. The frame supporting the tank is mounted upon sill beams 27, and supported upon these sill beams is a frame of any suitable construction in turn supporting bearing brackets 28 in which is mounted the shaft 29. This shaft is driven in any suitable manner, as by the wheels 30, and the shaft carries upon it an eccentric 31 having the usual eccentric ring 32 from which an eccentric rod 33 extends to an eye 34 mounted upon the cross member 13 of the frame. The eccentric rods are pivoted to this eye. It will thus be obvious that a rotation of the shaft 29 will cause an oscillation of the hangers or links 15 and a swinging motion of the frame.

The mixed sand, gravel, gold, and water is discharged upon the upper end of the screen in any suitable manner, as by means of a chute, and then as the screen reciprocates the sand and gravel will be caused to travel along the screen toward the exit end thereof in a manner well known to those skilled in the art. As the sand and gravel travel down upon the screen the fine particles of sand will drop between the bars 20 and will drop into the spaces or pockets defined by the partition walls 23, this fine sand and gold eventually sinking downward and coming to rest in the contracted bottom of the tank. As the screen is reciprocated the splash plates 24 will act to force the water contained within the tank between the partition plates upward through the screen, thus agitating the gravel and sand upon the top of the screen and causing a separation between the fine sand and gold and the coarse sand and gravel. Eventually only the coarse sand and gravel will remain upon the screen and this will be discharged over the apron 10. There will, of course, be a more or less constant flow of water through the tank, but any rapid flow of water will be absolutely prevented by the partitions 23, and the water can only find its way along the trough by being forced over the tops of the partitions and through the screen. The openings 5 will of course be ordinarily closed by plugs, but these plugs are removed when it is desired to let the water out of the tank and remove the fine sand and gold contained in the bottom of the tank.

It will be particularly noted that inasmuch as the space between adjacent screen bars 20 is contracted at its upper end the water which will be forced upward through the screen will be ejected with considerable force and thus prevent the coarse sand and gravel from clogging the slots and spaces between the screen bars. Furthermore, it will be seen that upon a movement of the screen in one direction water will be forced up between the splash plates and the partitions toward which the splash plates are moving, while upon a movement of the screen in the opposite direction the water will be drawn downward through the screen and the fine sand and other minerals will follow the water down through the slots between the screen bars until the machine reverses its motion.

I have found in practice that the screen constructed in accordance with my invention is very effective and that it does not clog, thus preventing any loss of precious metals. Further, inasmuch as the material falling through the screen sinks downward through a body of water which is kept in a more or less quiescent condition, the heavier material will sink more readily than the lighter material and as a consequence the gold will tend to separate from the fine sand.

Having described my invention, what I claim is:

1. A separator of the character described comprising a tank, a screen mounted in the top of the tank for longitudinal reciprocation, transverse partitions extending up from the bottom of the tank nearly to the under face of the screen, and rigid transverse splash plates carried by the screen and depending between said partitions.

2. A separator comprising a longitudinally inclined tank, a screen mounted in the upper portion of the tank for longitudinal reciprocation, means for longitudinally reciprocating said screen, partitions extending upward from the bottom of the tank nearly to the bottom of the screen, and transversely extending rigid splash plates depending from the bottom of the screen disposed between said partitions and spaced therefrom.

3. In a separator of the character described, a screen composed of vertically disposed parallel spaced bars, each bar increasing uniformly in thickness from its lower edge to its upper edge, the bars being spaced apart at their upper edges a distance less than the thickness of the bars at said upper edges to thereby provide vertically disposed screen spaces between the bars gradually contracting toward the upper edge faces of the bars, the upper edges of the bars all lying in the same plane, in combination with means for causing pulsation of water upward through the screen formed by said bars.

4. In a separator of the character described, the combination with a tank, of a screen composed of vertically disposed parallel spaced bars, each bar increasing in thickness from its lower edge to its upper edge, the bars being supported in parallel relation and being spaced apart at their upper edges a distance less than the thickness of the bars at the said upper edges to thus provide vertically disposed screen spaces between the bars gradually contracting toward the upper faces of the bars, the upper edges of the bars all lying in the same plane, means for longitudinally swinging the screen in a direction transverse to the bars, and means for causing pulsations of water upward through the spaces between the bars.

5. In a separator, a tank provided with a plurality of upwardly extending transverse partitions, a screen swingingly supported in the upper portion of the tank just above the upper edges of said partitions, said screen comprising a plurality of transversely extending parallel spaced bars, each of said bars gradually increasing in thickness from its lower edge to its upper edge, said bars being placed closely adjacent but in spaced relation to each other to thereby provide upwardly contracted screening spaces between the bars, and transverse splash plates carried by said frame and disposed one between each pair of partitions and coacting with said partitions to cause the liquid in the tank to be forced upward through the screen upon an oscillation of the screen.

6. In a separator, a tank, standards extending upward above the tank, hangers operatively supported from the standards and depending into the tank, said hangers being mounted for swinging movement, a screen supported by said hangers for swinging movement, said screen comprising upper and lower frames spaced from each other, a plurality of transversely extending screen bars set on edge and disposed between the upper and lower frames, each of said screen bars having a relatively thin lower edge and a relatively thick upper edge, the screen bars being disposed in close conjunction with each other whereby to provide upwardly contracting relatively narrow screening spaces between the bars, bolts passing through the ends of the screen bars and spacing members disposed between the screen bars and holding them in spaced position, and means for reciprocating said screen within the tank.

In testimony whereof I hereunto affix my signature in the presence of two witnesses.

DANIEL W. SHEPHERD.

Witnesses:
W. T. ROWLEY,
W. R. HYATT.